US008574068B2

(12) United States Patent
Lyons et al.

(10) Patent No.: US 8,574,068 B2
(45) **Date of Patent: *Nov. 5, 2013**

(54) SYSTEM, APPARATUS AND METHOD FOR SAVING GAME STATE AND FOR UTILIZING GAME STATES ON DIFFERENT GAMING DEVICES

(71) Applicant: Bally Gaming, Inc, Las Vegas, NV (US)

(72) Inventors: Martin Lyons, Las Vegas, NV (US); John Sommer, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,622

(22) Filed: Nov. 27, 2012

(65) Prior Publication Data

US 2013/0084967 A1 Apr. 4, 2013

Related U.S. Application Data

(63) Continuation of application No. 12/792,466, filed on Jun. 2, 2010, now Pat. No. 8,342,948.

(51) Int. Cl.
*G06F 17/00* (2006.01)

(52) U.S. Cl.
USPC .............................................. 463/25; 463/20

(58) Field of Classification Search
None
See application file for complete search history.

(56) References Cited

U.S. PATENT DOCUMENTS

2008/0026832 A1* 1/2008 Stevens et al. .................. 463/26
2009/0117962 A1* 5/2009 Filipour et al. ................. 463/16
2011/0111828 A1* 5/2011 Caputo et al. ................... 463/20

* cited by examiner

*Primary Examiner* — Michael Cuff
(74) *Attorney, Agent, or Firm* — Marvin Hein

(57) ABSTRACT

The present invention provides a gaming apparatus, method and system for transferring the play of a feature earned from one gaming machine, provided as a system bonus or as a promotional award to another gaming machine. The apparatus, method and system provides for selection between feature values $FV_A$–$FV_X$ of the gaming machine.

9 Claims, 6 Drawing Sheets

SYSTEM, APPARATUS AND METHOD FOR SAVING GAME STATE AND FOR UTILIZING GAME STATES ON DIFFERENT GAMING DEVICES

CROSS-REFERENCE TO RELATED APPLICATION

This application is a continuation application of co-pending U.S. application Ser. No. 12/792,466 filed Jun. 2, 2010 and titled "SYSTEM, APPARATUS AND METHOD FOR SAVING GAME STATE AND FOR UTILIZING GAME STATES ON DIFFERENT GAMING DEVICES".

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to systems, apparatus and methods related to gaming. More particularly it relates to apparatus, systems and methods for a player to save an awarded game state feature and to apply the feature at a later time to the same or a different game. It also relates to apparatus, systems and methods where a game state feature may be provided to the player as a promotion or as a system provided bonus.

BACKGROUND OF THE INVENTION

Electronic gaming devices, also sometimes referred to as "slot machines", have been known for many years. Currently these gaming devices are operated as stand-alone devices, linked games or terminals operated from a server, either on a thin client (most processing taking place at the server) or thick client (most processing taking place at the terminal) basis. By stand-alone what is meant is that the gaming device is self contained and does not rely on input or play from other gaming devices or a server for the play of the game. Linked gaming devices rely to an extent on other gaming devices. For example, devices may be linked to provide for one or more progressive jackpots or for shared, community play. Server based play relates to server based gaming where a server, at least in some respects, controls the play of games at the gaming devices. For example where the devices act as a thin client the server receives inputs and randomly selects symbols/numbers for presentation of outcomes at the devices. Alternatively the server may assemble sets of outcomes, e.g. lottery tickets, which are delivered to the devices for display of an outcome. This version is often referred to as central determination systems. Still further in a Bingo application the server may select Bingo outcomes which are displayed (or translated into the display) of outcomes at the gaming device.

Regardless of the arrangement of the gaming devices many modern gaming devices provide features in addition to a base game. For example, a player playing a base game may trigger a feature. The player of the base game may obtain one or more symbols during the play of the base game which "triggers" the feature. The feature may require player selections, provide a series of free base games, provide a multiplier for a series of free games or present an entirely different game experience.

The feature provides the player with an opportunity to win credits in addition to any win of the base game, with or without the player having to make an additional wager. As but one example, a player playing a video gaming device base game may be presented with an outcome which provides a win and pay for the base game outcome as well as triggering a feature such as selection from a set of unrevealed bonuses ranging from x to y. The player would be prompted to and would select from the selection set x-y and the bonus(es) would be revealed and won by the player. The bonus may be an award of credits, free games, multipliers, a combination of the foregoing, or other feature to entertain a player. In another example the play of the base game may trigger a feature representing by a series of free spins where any wins are paid at a multiple of the normal pay schedule for the game. The base game may trigger a feature embodied as a second game which is played such as spinning of a wheel or interactive play such as a series of events controlled in whole or in part by player input.

As is apparent gaming machines have been created which offer various base games and features. These games also offer different returns-to-player (RTP) usually designated as a theoretical percentage. Some regulated gaming jurisdictions set minimum RTPs such as 80% which means for every dollar wagered theoretically 80 cents will be returned to the player. The RTP for a game is configured by pairing the various statistical frequencies a designated winning combination will occur with the award and summing the results. The base game and any award from a feature contribute to the calculation of the game's RTP. On a casino floor there may be games with the same theme which have different RTPs (usually as a result of changing the award for certain outcomes) as well as different games altogether with varying RTPs. The different types of features as well as different theoretical awards for the same feature varies constrained only by jurisdictional constraints and the creativity of game designers.

Some gaming systems link gaming machines and provide one or more progressive bonuses for play of the game. These progressives, depending upon the configuration of the game, may be won during a base game or any enabled feature such as, for example, where the progressive is based upon combinations of symbols and where the feature consists of free spins. For example, the feature may be a certain number of free spins of the base game (or a version of the base game having different symbol sets to increase the hit frequency and/or return to player (RTP)) and one or more progressive jackpots may be won based upon symbols obtained. Hence a progressive could be won during the feature. Determining the RTP for such games includes taking into account the contribution to the RTP by the offering of one or more progressive jackpots.

Some gaming systems have secondary games which may be considered as features which are either (1) not based upon the player receiving triggering symbol combinations during the base game or (2) are based upon a determination by the system or controller rather than the gaming device. For example the feature may be triggered on a mystery basis such as described in Olive, U.S. Pat. No. 7,582,014 titled "Slot Machine Game and System With Improved Jackpot Feature" or Torango U.S. Pat. No. 6,592,460 titled "Progressive Wagering System" (the disclosures of which are incorporated by reference) where the feature trigger is randomly determined and the odds of receiving the bonus is proportional to the wager. The feature award may be by credits or the play of the feature resulting in the award of credits. An example of a system determined mystery bonus is Acres U.S. Pat. No.

5,655,961 titled "Method for Operating Networked Linked Gaming Devices" or U.S. Pat. No. 5,752,882 titled "Method and Apparatus for Operating Networked Linked Gaming Devices" (the disclosures of which are incorporated by reference) where the contribution from the linked gaming machines which causes the progressive bonus pool to equal a selected amount triggers a bonus to the contributing gaming device. These types of bonuses are typically referred to as mystery bonuses since they are not based on the symbols the player receives during play of the base game; hence to the player the basis for the award is a mystery. These awards are typically an award of credits to the player.

Turning from the general description of bonuses and features above, there is disclosed in the art a system for a player to save a game state for later play or play on the same or a different machine presenting the same game. Tarantino et al U.S. Pat. No. 6,656,047 titled "Computer-Controlled Gaming Apparatus and Method" describes a dice game where a player builds outcomes to complete categories of outcomes. According to this reference a player may save and store the game progress state for later use. Inasmuch as the game is a specific dice game, the saved game state (where the player is in the game in progress) cannot be used for different gaming machines offering a different game. Commonly owned Luciano, Jr. U.S. patent application Ser. No. 10/940,945 titled "Transferred Enhanced Gaming Play Features" describes another application of the broad principle of saving a game state.

The difficulty encountered in saving game states is application of a saved game state from one machine of a certain configuration to another gaming machine of a different configuration. For example if a player has won an opportunity to participate in a feature which consists of free games on a first gaming device and desires to save and then use the opportunity to play a different game on a second gaming device where the game feature is the selection from a set of unrevealed prizes instead of free games, such a transfer could not be accommodated since the features are different and have different contributions to the RTPs for the games. This problem has detracted from the utility of providing the player with the freedom to save and transfer an earned game state.

In addition to earning of a feature opportunity it would be advantageous if a gaming operator could provide, as a loyalty reward or as a result of a casino-wide game, a feature opportunity to players who could exercise the feature at a plurality of machines of their choosing.

There is a need for a system, apparatus and method which enables a player to save, at one gaming device having a first configuration, an opportunity for playing a feature game and which enables the player to exercise the saved opportunity on a second gaming device having the same or a different, feature game, configuration. This feature permits a player to accumulate feature opportunities at one or more gaming devices and then exercise those feature game plays at different gaming machines which may have, for example, a different feature presentation and award configuration.

There is also a need to provide awards of feature to players as a marketing tool and/or by a system or controller as all or part of a mystery award.

SUMMARY

There is set forth a gaming device for a system of the type having a number of gaming devices linked by a network to a backend computer. A player is provided with a record corresponding to a feature opportunity to play a feature. The feature opportunity may be, for example, earned during the play of one of the gaming devices or may be awarded to the player as a marketing tool or loyalty award based in whole or in part on the player's play or as a system based bonus. The record may be a physical voucher or an electronic record stored at or accessible to the backend computer. The feature opportunity has a determinable player pay back feature value of $FV_1$ (or RTP contribution) which is based upon the probabilities of the various outcomes and awards possible during the play of the feature as well as the amount wagered by the player when the opportunity was awarded. The gaming device where the feature will be played includes a display and an apparatus for receiving a wager. A game controller is configured to provide a base game and a feature having feature values $FV_A$–$FV_X$ none of which are equal to $FV_1$. The feature receiving gaming device includes apparatus for a player to transfer the provided feature opportunity of the record to the gaming device to enable play thereof. This apparatus may be, for example, a reader at the gaming device to read and apply the physical voucher or may be a player input interface with backend computer whereby the player can transfer the opportunity represented by the electronic record. At least one of the controller and backend computer is configured to select a feature value $FV_S$ for said feature opportunity to be played at the gaming device as between feature values of $FV_A$–$FV_X$ to provide a feature value consistent with the value $FV_1$. For example the controller and/or backend computer may randomly select $FV_S$ between $FV_L$ and $FV_H$ where both $FV_L$ and $FV_H$ are within the set of $FV_A$–$FV_X$ and $FV_L<FV_1<FV_H$. Once the feature value is selected the player may play the feature based upon the configuration and feature value of the selected feature.

There is also set forth a system including a plurality of gaming devices each configured to provide a base game and having at least one feature having a plurality of player payback feature values $FV_A$–$FV_X$. A communications network is provided for communication between the gaming machines and a backend computer. The system includes a record corresponding to a feature opportunity to play a feature having a player pay back feature value of $FV_1$. The record may be a physical voucher or an electronic record stored at or accessible to the host processor. $FV_1$ is different than any feature value $FV_A$–$FV_X$ for a first gaming device. The system includes apparatus for a player to enable the provided feature opportunity represented by the record at the first gaming device. At least one of a game controller and backend computer is configured to select a feature value $FV_S$ for said feature opportunity as between feature values of $FV_A$–$FV_X$ of the first gaming device to provide a feature value corresponding value as $FV_1$, with play of said feature at the first gaming device proceeding according to said selected feature and its value $FV_S$.

There is also set forth a method for applying to a first gaming device a feature opportunity earned at a second gaming device which includes providing the first gaming device with base game and a feature, the feature having feature values of $FV_A$–$FV_X$ and determining the value $FV_1$ of the earned feature opportunity, the value $FV_1$ different from any value of $FV_A$–$FV_X$. A record is created related to the earned feature. The method includes the first gaming device receiving the record to enable the feature opportunity at the first gaming device and selecting from one of said feature values $FV_A$–$FV_X$ a selected value $FV_S$ such that said first gaming device provides a feature value consistent with $FV_1$. The feature opportunity at the first gaming device is played according to the selected feature value.

Additionally there is set forth a method for providing a system bonus to gaming devices connected to network, each gaming device providing a base game and a feature having a value $FV_A$–$FV_X$. The method includes at a backend computer selecting a feature value to award to one or more of said gaming devices having a value $FV_1$ where $FV_A<FV_1<FV_X$ and issuing the award to one or more of the gaming devices. If $FV_1$ corresponds one of said values $FV_A$–$FV_X$, selecting the corresponding feature and value for play at the gaming device and if $FV_1$ does not correspond one of the values of $FV_A$–$FV_X$ then (1) determining the feature value lower $FV_L$ and higher $FV_H$ such that $FV_L<FV_1<FV_H$ and randomly selecting one of said $FV_L$ or $FV_H$ as the feature and feature value. The gaming device is then played according to the selected feature value.

BRIEF DESCRIPTION OF THE DRAWINGS

These and other features of the present invention will become appreciated as the same becomes better understood with reference to the description, claims and drawings wherein:

DETAILED DESCRIPTION

Figure 1:
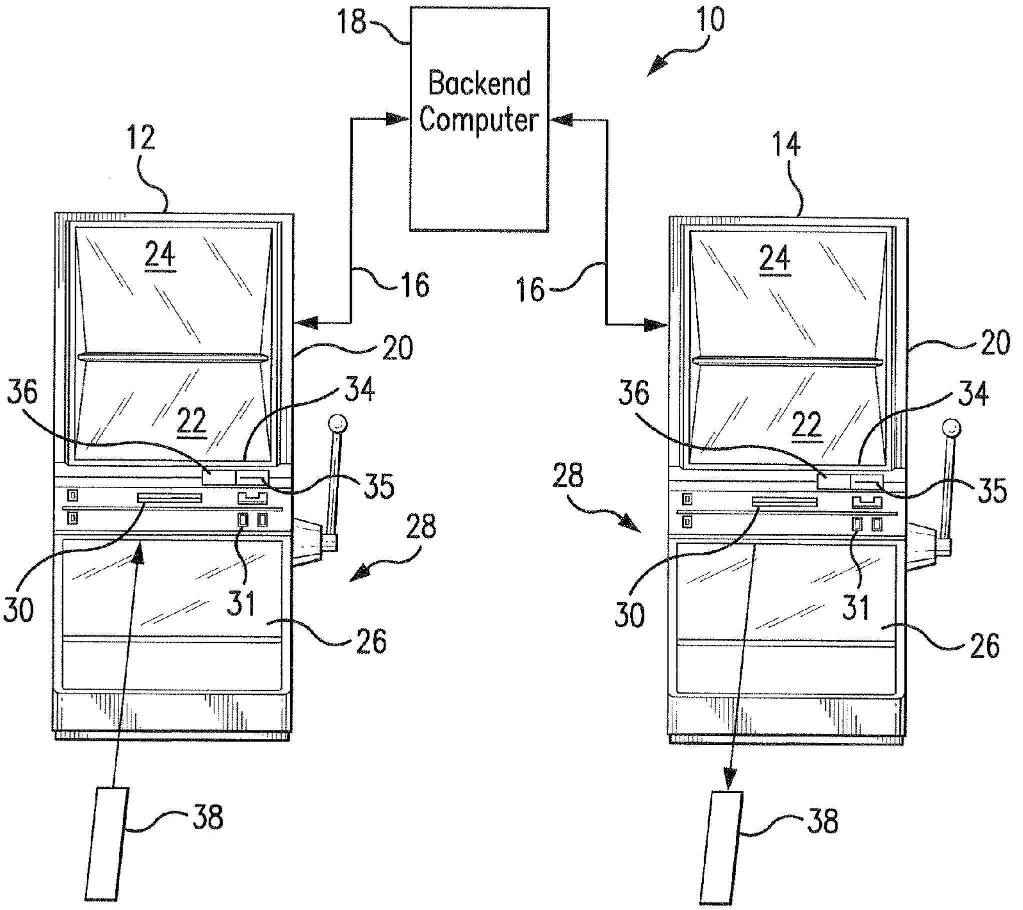
FIG. 1 illustrates gaming machines connected to a network and a backend computer.

Referring now to the drawings, FIG. 1 shows an aspect of an embodiment of the present invention. A system 10 includes a number of gaming terminals or devices such as a first gaming device 12 and second gaming device 14 which are linked by a network 16 to a backend computer 18. While only two gaming devices are illustrated it should be understood that the system 10 may include several thousands of such gaming devices. Where the system 10 is configured for internet gaming, the system 10 may include many more devices such as, for example, player's personal computers connected on a local or worldwide basis. The first and second gaming devices 12, 14 may be configured to be stand-alone games or may be linked to, for example, fund and provide progressive prizes and/or linked gaming as is known in the art. Further the first and second gaming devices 12, 14 may be either thin or thick client gaming terminals which co-act with the backend computer 18 to provide games to the player. Where the first and second gaming devices 12, 14 are thin client devices the system 10 is configured as a server based gaming system where the bulk of the processing takes place at the backend computer 18. Where the first and second gaming devices 12, 14 are thick client devices the processing is shared between the devices and the backend computer 18. The first and second gaming devices 12, 14 may also be configured as devices where games from a library stored at the backend computer 18 can be downloaded to the devices for play thereof. In this case the system 10 would include downloadable games. Accordingly it should be understood that while the following description is directed to a circumstance where the system 10 is in a casino and the first and second gaming devices 12, 14 are stand-alone games, the following description should not be interpreted as limiting the invention to a specific configuration of the gaming devices and system.

Each first and second gaming device 12, 14 includes a cabinet 20 supporting a gamine display 22 and housing the various operative components for the device. The display 22 may be a CRT, LCD, OLED, plasma or other electronically controlled video display. Additionally the display 22 may be a glass covering electro-mechanical stepper reels (not shown) as well. Still further the display 22 may be a combination of both video and stepper reels. A secondary display 24 may also be provided which could be any display-type as described in the foregoing. Alternatively the secondary display 22 may be embodied as a printed panel for example displaying a pay table and game title for the device. Below the display 22 there may be a printed panel belly glass 26.

Contained within the cabinet 20 is a game controller 28 consisting of a computer processor and associated memory devices as is known in the art which process data, respond to player inputs and commands and interface and operate peripherals as hereinafter described. The controller 28 is, for example, configured to provide and display a game at the display 22 (and perhaps also at secondary display 24) which consists of a base game and a feature. For the first gaming device 12 the base game may be a video or stepper five reel slot machine game having an Egyptian theme. Depending upon the symbols displayed for any "spin" (play) of the game the player receives a winning or losing outcome. For a winning outcome the player receives an award usually based upon the amount of the player's wager. The base game may also include a feature "trigger" consisting of one or more symbols. If the trigger symbols are displayed from a spin, a feature (or secondary game) is triggered. In this hypothetical Egyptian themed game the trigger may be the player receiving three pyramid symbols. The feature could be triggered as well by an associated controller such as described in Olive and Torango, identified above. When triggered the feature offers the player an opportunity to win more game credits. For example the feature may present a set of symbols the selection of which reveals prizes added to the player's credits. The feature may be free spins of the base game perhaps with enhanced odds for winning and perhaps with a pay multiplier. The feature may be an action sequence where the player must interact to obtain rewards such as controlling a character on a path, selecting from various options and the like. The feature may consist of spinning a wheel or reel displayed at the secondary display 24.

The first and second gaming devices 12, 14 also include a validator 30 which is in communication with the controller 28 and which is configured to receive and read credit voucher tickets and cash script. The tickets may include a bar code or glyph as well as printed information such as the value of the ticket, expiration date, ticket serial number and the like. Each first and second gaming device 12, 14 also includes a ticket printer 32 which is also in communication with the controller 28 and is configured to print the distribute credit voucher tickets. The printing and reading of credit voucher tickets is well known in the casino industry. In this regard the controller 28 is in communication with the backend computer 18 to coordinate the printing, distribution and redemption of the tickets.

Each of the first and second gaming devices 12, 14 includes apparatus for the player to make a wager. For example the player may insert cash of a cash voucher into the validator 30 to register game credits for play. An input device such as a wager button 31 enables the player to make the desired wager such as, for example, 10 credits per each available pay line. It should be understood that the gaming devices may also include apparatus for receiving coin or token wagers (not shown) for accumulating credits for wagering or making a wager.

The backend computer 18 may consist of several processors and servers each providing a desired function. For example the backend computer 18 may represent a slot accounting system including a server and data base which tracks and records for accounting, security and maintenance purposes the cash/tickets received by each gaming device, wins ("jackpots"), pay outs, events such as opening of the cabinet 12 and the like as is known in the art. One example of a slot accounting system is the ACSC Slot Management System sold by Bally® of Las Vegas, Nev. or the OASIS™ product sold by Aristocrat Technologies, Inc also of Las Vegas, Nev. In addition to providing accounting and related functionality the backend computer 18 may also represent player tracking and system bonusing functionality. Each of the first and second gaming devices 12, 14 includes a system-player interface shown as a player tracking module or PTM 34. The PTM 34 has a card reader to read data stored on a player tracking card (not shown) to access the player's loyalty account stored at the backend computer 18. As the player plays the first or second gaming devices 12, 14 the player earns "comp" points which can be converted into cash, gifts or used to pay for meals and lodging. The PTM 34 also has a PTM display 36 and player input device such as a keypad (not shown) to enable the system to convey information to the player and for the player to provide input to the system. One such PTM 34 is the iView® sold by Bally Gaming International of Las Vegas, Nev. The player account stored at the backend computer 18 includes player information as well as the player's earned comp points. As can be appreciated the backend computer 18 represents backend functionality for the slot accounting, player tracking and other system controlled events and functionality as described herein even though there may be multiple computer servers, data stores and the like. For player tracking the PTM 34 includes a loyalty card reader 35. To identify the player to the system 10 and for the purpose of allocating comp points to the player's account, the player would insert a player card (not shown) have a machine readable element read by the PTM card reader 35 to identify the player. The backend computer 18 also generically represents the supporting data structure and computer servers where the first and second gaming devices 12, 14 are server based gaming devices, server assisted gaming device or downloadable gaming devices. The backend computer 18 also represents, where configured, fund accounts available for the player to download to a gaming device for wagering.

The network 16 may be a wired or wireless network and may include intermediate pollers, switches, computer processors, computer backup facilities (not shown) as is known for operating a system 10 of the type described herein. Where the system 10 is to support internet gaming, the system 10 would include the internet public infrastructure. Messaging in the system 10 may be according to the protocols established by the Gaming Standards Association.

Each feature associated with one of the first and second gaming devices 12, 14 has a theoretical feature value FV. The determination of the feature value is described with reference to the following example.

Example 1

Second gaming machine 14 offers a base game (for example based upon a Viking theme) which has an overall 87% RTP (Return to Player). A feature is provided consisting of an opportunity to play 20 free games where (a) awards are doubled and (b) where the virtual game reel strips are configured to provide, during the free game set, an RTP of 225% thus providing the player with a greater opportunity to win. The feature value FV for this free game feature would be: (RTP)×(# of free games)×(multiplier)×(wager amount). Assuming the player was wagering ten credits when the feature was triggered, then FV=2.25×20×2×10=900 credits. Theoretically, based upon the amount wagered, the player on average will earn 900 credits for play of the feature.

Based upon the nature and configuration of the feature, a feature value can be determined. Frequently in designing the game, since the feature of the game contributes to the overall RTP, the feature value is calculated by the game designers and based upon the theoretical chances of triggering the feature and its award structure, the contribution of the feature can be determined per unit wagered. Thus when a casino operator acquires a game the associated documentation such as the game par sheet (a list of the winning awards, pays and probabilities or occurring) would set for the feature value. Where the feature value is not described it can be calculated as described above.

Assuming a player playing the second gaming device 14 has wagered 10 credits and has received an outcome of the base game which has triggered the feature of Example 1 above. According to the present invention the player can elect to play the feature at the second gaming device 14 or he/she can save the feature value for play of the same feature on the same machine type at a different location or at a different time or can transfer the play of the feature for play at a different device such as the first gaming device 12 having an Egyptian theme. If feature is one that can be saved and the player decides to save the feature, a prompt would be displayed at the display 22, secondary display 24 and/or PTM display 36 informing the player of the option to save the feature opportunity. The player would follow directions to save the feature opportunity such as by, for example, touching an icon on the display 22. In response to the player electing to save the feature opportunity the controller 28 for the second gaming machine 14 would send a message to the printer 32 to print a voucher reflecting the saved feature opportunity as well as the feature value $FV_1$, which in this example is 900 credits. Preferably, the feature value would not be discernable by the player by reading the voucher; the feature value may be encrypted or referred to by a unique identifier. In addition to the printing of the voucher 38 the controller 28 would cancel the earned feature opportunity at the second gaming device 14 and would cooperate with the PTM 34 or other system-slot machine interface to send a message to the backend computer 18 identifying the saved opportunity and its feature value $FV_1$. Each voucher 38 and the record at the backend computer 18 would be encoded with a unique identifier such as a number. The opportunity record may also include the time, machine number, casino where the opportunity was earned, the name of the game where the opportunity was earned as well as bet information and identification of the opportunity, e.g. "20 free spins at 2×" for future reference and to resolve and disputes. The record may also include, where available, the name of the player who earned the feature opportunity.

Alternatively the player may be prompted to save the earned opportunity into the player's electronic account. Upon earning the opportunity the player would receive the prompt and would respond by touching and icon or depressing a button. The feature opportunity would be uploaded from the second gaming machine 14 to the backend computer 18 and stored in the player's account or at a data structure storing saved features for future use. The printer 32 may print and dispense to the player a receipt reflecting the stored opportunity. The stored feature opportunity includes the information referenced above including $FV_1$, time, machine number, casino where the opportunity was earned, reference number, the name of the game where the opportunity was earned as well as bet information and identification of the opportunity, e.g. "20 free spins at 2×" for future reference and to resolve and disputes.

Alternatively, in the case where a gaming machine is capable of playing multiple different games, the opportunity may be transferred from game to game within the machine with no backend requirement.

To transfer the saved opportunity to, for example, the first gaming device 12 according to an embodiment where the player has received a ticket voucher 38, the player would insert the voucher 38 into the validator 30 of the first gaming device 12. Based upon the machine readable information on the voucher 38, the controller 28 identifies $FV_1$ for the opportunity (in this case 900 credits and compares it to the feature(s) it has stored in memory). The controller 28 also communicates with the backend computer 18 to verify the saved feature, to enable the feature for play at the first gaming device 12 and to tag the feature as being transferred so that it may not be played again. If the saved feature opportunity is saved as a record at the backend computer 18, the player would establish communication with the backend computer 18 such as by inserting their player tracking card in the PTM card reader 35 and entering a personal identification number. They could then either insert their receipt voucher or could follow instructions on the PTM display 36 to enable the controller 28 and backend computer 18 to cooperate to enable the earned feature opportunity at the first gaming device 12.

If the first gaming device 12 and the second gaming device 14 offer the same game (theme, RTP, features) then the controller 28 fetches to same feature to display to the player for play thereof. The player would receive 20 free spins and 2× pay with the enhanced reel symbol set (225% RTP) and based upon a wager of 10 credits. Whatever the player wins during the play of the feature is added to the credits available for gaming. If however the first gaming device 12 is a different game, the controller 28 and or backend computer 18 must determine which feature of the first gaming device 12 can be played by the player to provide a corresponding, if not identical, feature RTP.

To accommodate the transfer of the earned feature opportunity, one or more of the first and second gaming devices 12, 14 are configured to have two or more features having a range of feature values $FV_A$–$FV_X$. The range may be two values or a data structure may store data corresponding to many more feature value configurations. Preferably there are numerous feature values and also preferably the features all have a common lowest value and highest value, i.e. where $FV_A$–$FV_X$ represent a range from lowest $FV_A$ to highest $FV_X$ are the same for the plurality of gaming devices. Also, to accommodate features won on minimum wagers, there may be at least one stored feature value of 0 or other small value.

For the continuing example, the first gaming device 12 offers an Egyptian themed game. The feature for this game may be one where the player selects from a displayed set of offerings of ten boxes to reveal a prize. For this example it will be assumed that the feature of the first gaming device has four different feature sets offerings, each available to the player, and each set providing a range of awards as suggested in Table 1 below. The awards of the table may be scaled based the player's total bet or line wager or may be independent of the wager. During regular play of the feature the game controller would randomly select which set to display to the player for play. The selection may be weighted in favor of low or intermediate award sets.

TABLE 1

| Set 1 | Set 2 | Set 3 | Set 4 |
|---|---|---|---|
| 5 | 2 | 2 | 50 |
| 10 | 3 | 3 | 100 |
| 20 | 10 | 5 | 200 |
| 25 | 20 | 5 | 250 |
| 150 | 50 | 10 | 300 |
| 150 | 75 | 15 | 500 |
| 200 | 100 | 20 | 600 |
| 200 | 100 | 40 | 3000 |
| 250 | 200 | 50 | 5000 |
| 1000 | 5000 | 350 | 20000 |

Based upon the number of selections and the sum of the awards a feature value can be determined for each set (assuming a unit wager or a condition where the values of Table 1 are not scaled based upon the player's wager).

Set 1, $FV_A=(5+10+20+25+150+150+200+200+250+1000)/10=201$

Set 2, $FV_B=(2+3+10+20+50+75+100+100+200+5000)/10=556$

Set 3, $FV_B=50$

Set 4, $FV_D=3000$

To determine which set will be offered to the player transferring $FV_1$ having a value of 900 credits, the controller 28 determines the nearest lowest and nearest highest feature values which in this case is $FV_B$ and $FV_D$ at 556 and 3000 respectively. Accordingly $FV_B<FV_1<FV_D$. The controller 28 also derives a zero based set of numbers N (for example 0-Z) where in this example $Z=FV_D-FV_B-1$ or $3000-556-1=2443$ resulting in N=0-2443. A random number R is selected from the set N and if R is greater than or equal to $(FV_1-FV_B)$, then the set represented by the lower set feature value $FV_B$ is selected as the feature value $FV_S$ for presentation and play by the player. Otherwise the higher feature valued set $FV_D$ will be selected as $FV_S$ and presented to the player.

Figure 2:
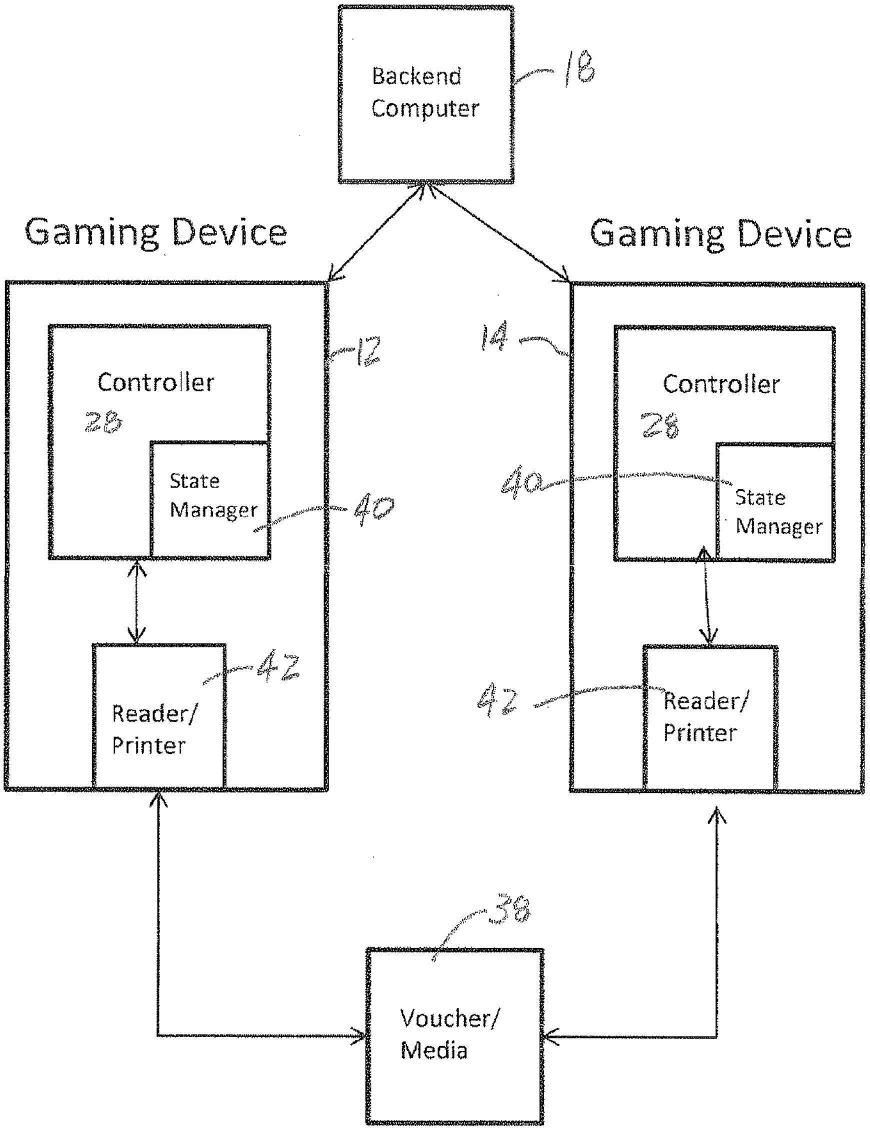
FIG. 2 is a diagram illustrating the apparatus, system and method of the present invention.

FIG. 2 provides a graphical representation of the transfer of the feature opportunity. First and second gaming devices 12 and 14 each include the controller 28. Each controller 28 is associated with a state manager 40 which manages the feature states for the gaming device. One or more of the controller 28 and state manager 40 stores the library of features and associated feature values $FV_A$–$FV_X$. The controller 28 and state manager 40 may be embodied as separate or a single device. As shown in FIG. 2, each of the first and second gaming devices 12, 14 includes a reader printer 42. The reader printer 42 may be embodied as the validator 30 and printer 32 described with reference to FIG. 1 above.

With continuing reference to FIG. 2 and the example described above, when a player earns a feature opportunity at the second gaming device 14 and the player decides to save the feature, the controller 28 and state manager 40 cooperate to cause the reader/printer 42 to print a voucher 38. It should be understood that the saved feature opportunity could also be saved on any other type of machine readable device including a portable memory device such as a USB flash drive, player loyalty card, memory card or other portable memory media.

As described above each of the first and second gaming devices 12, 14 are in communication through a network with the backend computer 18. The issuance of the voucher 38 or writing the saved feature opportunity to a portable media also causes a record to be received/generated at the backend computer 18 related to the saved opportunity. Alternatively, in lieu of writing a record to a voucher 38 or other media, the saving of the feature opportunity may consist of the player generating an input at the gaming device to cause a record of the opportunity to saved at the backend computer 18 in a player account or in a another accessible data structure. The reader/printer 42 may print and dispense to the player a receipt related to the saved feature opportunity. At the first gaming device 12 the player inserts the voucher 38 into the reader/printer 42 (or validator 30 of FIG. 1) which is read and results in the feature opportunity being transferred to the first gaming device 12 as described above. Where a receipt is provided, the player at the first gaming device 12 would open a link through the network 16 with the backend computer 18. The receipt would be read by the reader/printer 42 (or validator 30) to enable the feature opportunity at the first gaming device 12. Where the feature opportunity is saved electronically to the player's account at the backend computer 18 or at another data structure), the player would initiate a link to the backend computer 18 such as by inserting their player card in the PTM 34 reader 35. Using a personal identification number (PIN) the player can access their account and download from the backend computer 18 the feature opportunity to the first gaming machine 12. The backend computer 18 provides validation of the saved feature and tracking of the use of features so they may not be improperly re-used. Once downloaded the record is marked as "used" or "redeemed" so that the liability for the opportunity may be accounted for. In this regard any saved opportunity would have an expiration date such as thirty days from the date the opportunity was saved so the operator would not have carry the liability for the opportunity in perpetuity on its books.

As stated above the saved feature opportunity has a value. In one embodiment, when the opportunity is saved, the controller 28 and/or state manger 42 determines the value contemporaneously with printing of any voucher 38 or receipt or saving of the opportunity at the backend computer 18. In another embodiment the opportunity value is determined at the backend computer 18 contemporaneously with the saving and recording of the opportunity. As another alternative the value of saved opportunity is determined at the gaming machine where the opportunity is, in effect, being redeemed.

Figure 3:
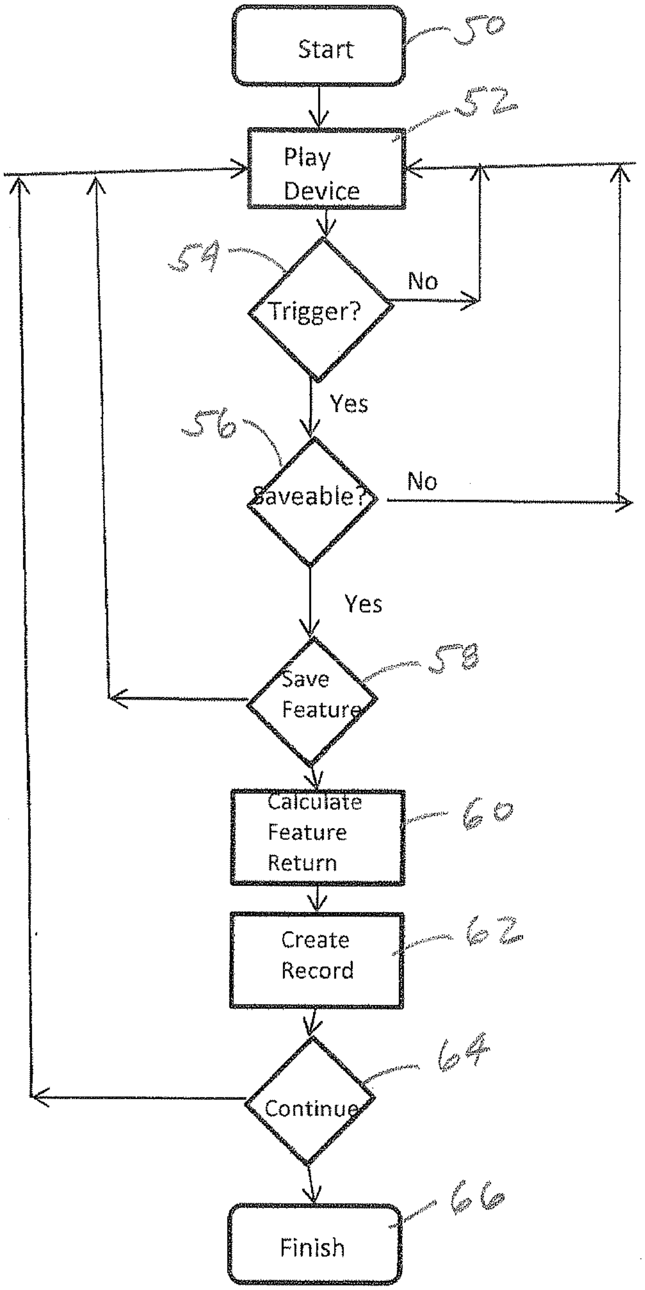
FIG. 3 is a flowchart illustrating the saving of a game state feature earned during play of a gaming device.

FIG. 3 shows a flow diagram for the awarding and saving of a feature according to one embodiment of the present invention. At 50 the gaming device is started as by, for example, booting up the controller 28 and verifying the operational status of the gaming device 12 and its peripherals as well as, where required, verifying that the communication link to the backend computer 18 is established. At 52 the player plays the gaming device base game by inserting a wager and prompting play. The controller 28 randomly selects and displays a base game outcome at the display 22. In some arrangements, as discussed above, the backend computer 18 may select the outcome and cooperate with the gaming device 12 to display the outcome. At 54 the base game outcome is tested to determine if there are any winning symbol combinations on the display and if a feature has been won. For example the feature may be triggered (i.e. won) by the player obtaining a predetermined symbol or a combination of symbols on the display. The feature may also be won through a secondary game running concurrently with, before or after the base game such as described in Olive, U.S. Pat. No. 7,108,603 or Torango U.S. Pat. No. 6,592,460 referenced above. If no feature has been won, the player is paid for any wins of the base game and continues play by wagering and playing another spin of the base game at 52. If a feature has been won at 56 the controller 28 (or backend computer 18 depending upon the configuration) determines if the feature is one that is saveable by the player. If the feature is not one that is determined to be saveable (i.e. has too low of a feature value based upon the player's wager), the player plays the feature and returns to 52 to play another spin of the game. If the feature is saveable, such as the 20 free game feature of Example 1 above, the player at 58 has the option to save the feature. If he chooses not to save the feature, the feature is played at the second gaming device 14 and the player plays another spin at 52. If the player elects to save the feature at 58, in one embodiment the controller 28 and/or state manager 40 calculates at 60 the feature value and the feature is saved and a record created at 62 as described above including printing of a voucher, receipt or lodging the record in the player's or other accessible account at the backend computer 18. At 64 the player determines whether to continue or discontinue play. If play is continued at 52 another wager is made and another spin is initiated. If play is to be discontinued at 66 the player finishes play such as by cashing out any remaining credits, if any, and removing their player tracking card from the PTM 34 and leaving the gaming device.

Figure 4:
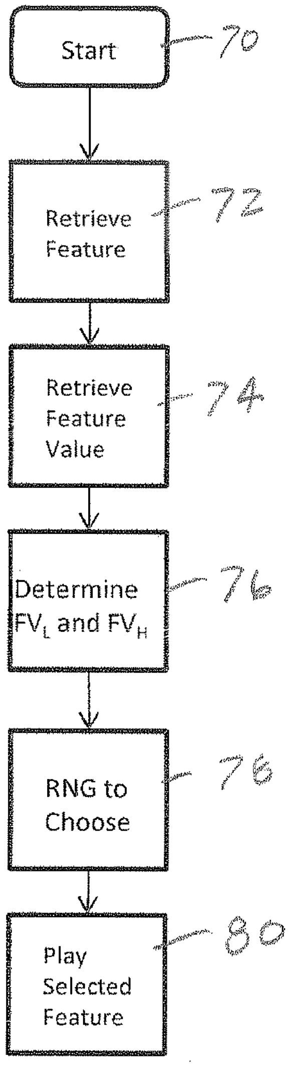
FIG. 4 is a flowchart showing the transfer and play of the saved game state feature.

At FIG. 4 there is shown a flow diagram for the player to redeem the saved feature at another gaming device, such as the first gaming device 12. At 70 the first gaming device 12 is started as by, for example, booting up the controller 28 and verifying the operational status of the first gaming device 12 and its peripherals as well as, where required, verifying that the communication link to the backend computer 18. At some point during play the player at 72 decides to retrieve the saved feature for play at 72 on the first gaming device 12. As described above the retrieval may simply entail the player inserting the voucher into the validator 30 or reader/printer 42. The controller 28 and state manager 40 cooperate to at retrieve at 74 the feature value $FV_1$ of the saved feature (from the voucher 38 or the backend computer 18) and at 76 determines the features and features' values. If there is a feature having a value equal to $FV_1$ then the gaming device would activate that feature for play by the player. If there are no matching feature values for the gaming device then the controller 28 and or state manager 40 determines $FV_L$ and $FV_H$ where $FV_L<FV_1<FV_H$. Preferably $FV_L$ is the feature with a feature value nearest to, but less than, $FV_1$ and $FV_H$ is the feature nearest to, but with a feature value greater than $FV_1$ as described in the Example 1 above. One or both of the controller 28 and state manager 40 at 78 use a random number generator (RNG) to select which feature and value as between $FV_L$ and $FV_H$ will be selected as feature value $FV_S$ to be presented to the player for play. In one embodiment, as described above with reference to the Example 1 above, the controller 28 and/or state manager 40 may determine a range of numbers N where $N=FV_H-FV_L$ and randomly select a number R within that range. If R is greater than or equal to $(FV_1-FV_L)$, then the feature of $FV_L$ is selected as $FV_S$ and presented to the player for play at 80. Otherwise the feature with the higher feature valued $FV_H$ will be selected as $FV_S$ and presented to the player at 80 for play. After the play of the feature is finished at 80 and the player is awarded any earned credits, the player can continue or discontinue play.

With reference to the saving and retrieving of play of a feature, a further example shows how the feature may be played even where the range of features includes progressive prizes.

Example 2

This example will be similar to Example 1 above where a player has earned at a second gaming device 14 a feature having a value of 900 credits but in this example desires to play the feature at a first gaming device 12 having one or more features which are progressive prizes. In this example the feature of the first gaming device 12 includes the player opportunity to spin a wheel to reveal a prize where four of the possible prizes are progressive prizes. The controller 28 may randomly select which prize schedule P1-P4 to provide to the player and randomly select the stopping positions from the selected set as the prize where for any set each prize has a probability for winning the prize such as suggested by Table 2 below.

TABLE 2

| Prize | P1 | P2 | P3 | P4 |
|---|---|---|---|---|
| L1 | 0.001 | 0.0001 | 0.00001 | 0.02 |
| L2 | 0.019 | 0.0099 | 0.00099 | 0.07 |
| L3 | 0.08 | 0.09 | 0.009 | 0.25 |
| L4 | 0.6 | 0.4 | 0.2 | 0.4 |
| 50 credits | 0.1 | 0.2 | 0.1 | 0.187 |
| 10 credits | 0.1 | 0.1 | 0.1922 | 0.045 |
| 5 credits | 0.1 | 0.2 | 0.4978 | 0.028 |

Table 2 shows, for example for set P1, on any spin of the feature wheel the player has a 60% chance of winning progressive jackpot L4 (described below) and a 10% chance of winning a prize of 50 credits.

In this example L1-L4 are progressive jackpots. In other words several gaming devices would be linked and a portion of each wager would be allocated to each jackpot to cause the jackpot to increase from a seed (or reset) value. Each time a progressive jackpot is won it resets to the reset value. The rates of progression (ROP) (how much from each wager is allocated to a progressive jackpot), is configured by the provider of the jackpots. The progressive jackpots L1-L4 may be configured in this example as shown in Table 3 below.

TABLE 3

| Progressive Level | Reset Value | ROP |
|---|---|---|
| L1 | 100,000 | 1% |
| L2 | 1,0000 | 1% |
| L3 | 1000 | 2% |
| L4 | 100 | 2% |

The expected return (E) for each progressive prize may be calculated by the equation:

$$E=(\text{Probability of win})\cdot(\text{Reset Value}+\text{ROP})$$

Mystery progressives may be otherwise configured.
The expected return for each progressive can then be determined for each progressive jackpot.

$$E(L1)=0.001\cdot 100{,}000\cdot(1+0.01)=100.1$$

$$E(L2)=0.019\cdot 10{,}000\cdot(1+0.01)=190.01$$

$$E(L3)=0.08\cdot 1000\cdot(1+0.02)=80.02$$

$$E(L4)=0.6\cdot 100\cdot(1+0.02)=60.02$$

The feature values for each set P1-P4 can now be determined by summing the expected returns.

$$FV_{P1}=100.1+190.01+80.02+60.02+50(0.1)+10(0.1)+5(0.1)=436.56$$

By the same method the other values can be calculated.

$$FV_{P2}=251.06$$

$$FV_{P3}=50$$

$$FV_{P4}=3000$$

Based upon the saved feature value $FV_1$ of 900 credits the controller 28 and/or state manager 40 would identify $FV_{P1}$ as $FV_L$ and $FV_{P4}$ as $FV_H$. The controller 28 and/or state manager 40 would randomly select one of $FV_{P1}$ or $FV_{P4}$ as the prize set to be offered to the player. Preferably the controller 38 and/or state manager 40 would randomly select a number R between $FV_{P4}-FV_{P1}$ and if R<FV1 or if R≤FV1 then the set $FV_{P1}$ would be selected as the selected feature set $FV_S$ and presented to the player otherwise set $FV_{P4}$ would be presented.

Other algorithms could be used to select the feature and feature value to be played on the first gaming device 12. Additionally the player may be given the opportunity to exchange a fixed prize for an opportunity to play a feature. For example, if the player won a prize of 900 credits in the base game they could exchange it for a feature value of the same value and perhaps, when redeemed, earn additional credits.

Players may be given exchangeable feature values as a promotion as well rather than having to earn them during play. For example a casino may mail a redeemable coupon to customers having feature values of a certain value or may alert players that the casino has stored a feature value of a certain amount in the player's account at the backend computer 18.

Exchangeable features may also be used by a casino to retire a progressive jackpot, as mandated by government regulations such as Nevada Regulation 5.110.5(c). In this scenario, the jackpot amount would be parceled into a set of feature values (FV), each of which would be awarded to players either all at once, or over a period of time.

In some instances a player may earn a feature at a second gaming device 14 which does not qualify to be saved. For example if they only bet one credit and won a feature having only a value of eight credits, that feature may have to be played where earned. In other words the provider may designate a minimum feature value which can be saved and transferred.

The determination of the feature value may be, and often is, based upon the wager when the player triggered the feature. For example a gaming may offer a feature having ten free spins with each win paying double and using virtual reel strips having RTPs of 85%, 100%, 150% and 200%. By virtual reel strips what is meant is that the controller 28 includes a data structure storing data representing symbol distributions for one of more reels which, based upon random selection and the game pay table, results in the calculated RTP. Based upon a unit wager on one pay line the following feature values can be calculated.

$$\text{FV for 85\% reel strip}=0.85\cdot 10\cdot 2=17$$

$$\text{FV for 100\% reel strip}=20$$

$$\text{FV for 150\% reel strip}=30$$

$$\text{FV for 200\% reel strip}=40$$

By initiating the feature with ten pay lines and five credits wagered per line the above FVs are as follows: (RTP)·(# of free games)·(multiplier)·(wager per line)·(# of lines).

$$FV=(17)\cdot(5)\cdot(10)=850$$

$$FV=(20)\cdot(50)=1000$$

$$FV=(30)\cdot(50)=1500$$

$$FV=(40)\cdot(50)=2000$$

For Example 1 where the transferred $FV_1$=900, $FV_L$ is 850 and $FV_H$ is 1000. The controller 28 and state manager 40 would randomly select between $FV_L$ and $FV_H$ as described above.

The selection as between $FV_L$ and $FV_H$ in any embodiment could occur once for the entire feature or, for example, where the $FV_S$ includes ten free spins the selection between $FV_L$ and $FV_H$ could occur preceding each free spin.

Figure 5:
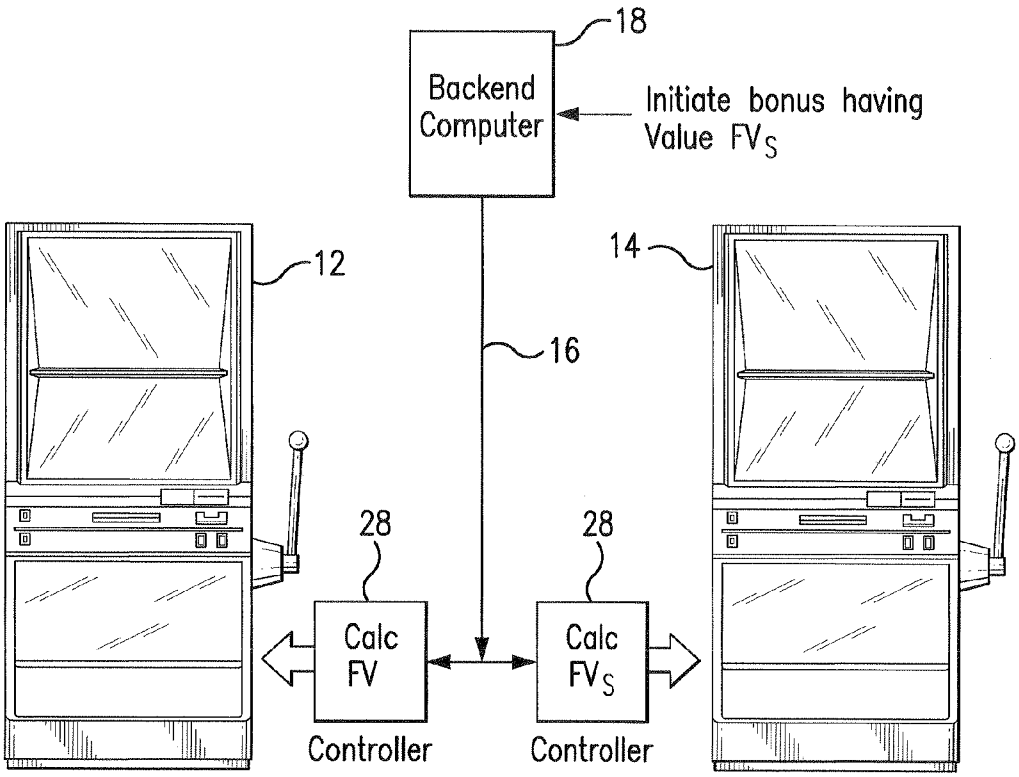
FIG. 5 is a diagram illustrating a system bonus of a feature.
Figure 6:
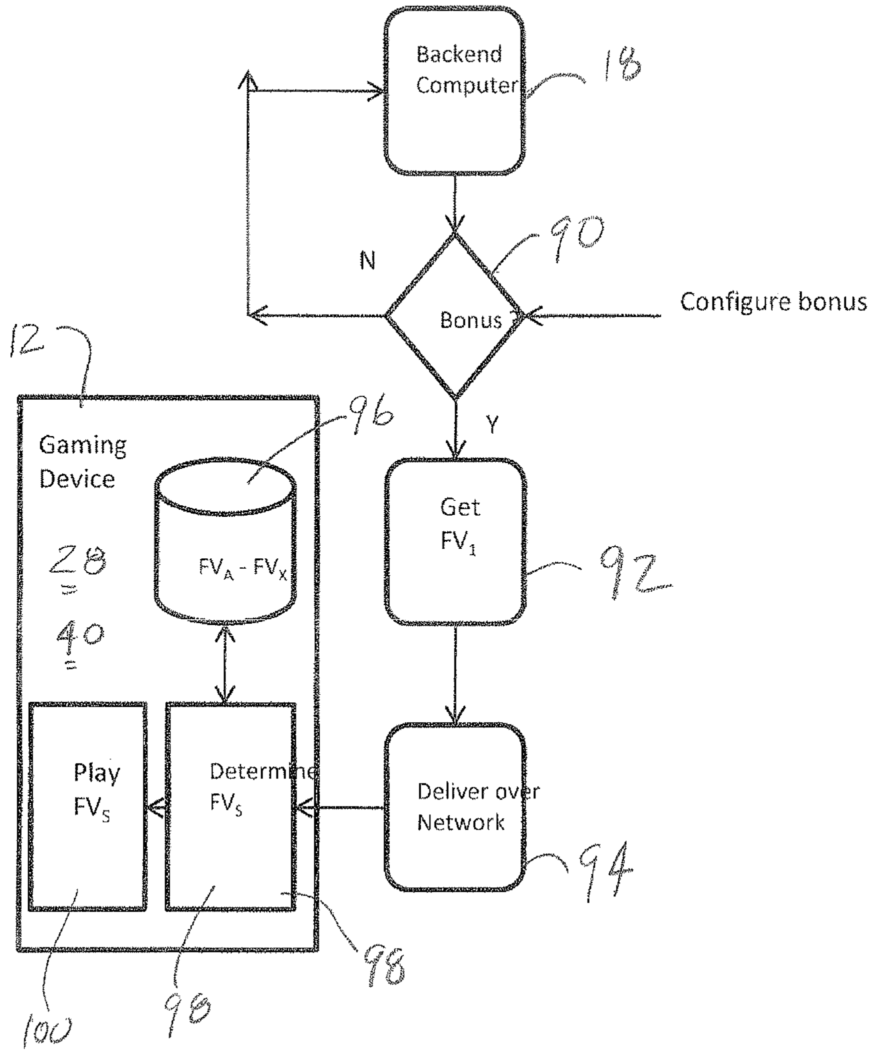
FIG. 6 is a flowchart showing the delivery of a system bonus.

Turning to FIGS. 5 and 6 an additional embodiment of the present invention is shown where the feature value is awarded as a system delivered prize. FIG. 5 shows the backend computer 18 which in this embodiment may be a dedicated server or may be a module of a player tracking or slot accounting system computer and data structure. The backend computer 18 communicates through a network with controllers 28 which may be the gaming machine controller, a controller incorporated into the PTM 34 or a combination thereof. Each controller 28 would be configured to the machine and game architecture. As described above each controller 28 and/or state manager 40 (not shown in FIG. 5) would include data corresponding to features having a range of values $FV_A$–$FV_X$. Gaming devices 12 and 14 are also shown in FIG. 5.

As described above the gaming devices 12, 14 may be stand alone, linked games, or thin or thick gaming terminals. In an Internet environment the gaming devices 12, 14 may be personal computers, cellular telephones, PDAs or other digital device.

The backend computer 18 would be in communication with a terminal (not shown) by which an operator can configure feature bonuses according to the present invention. The operator may be a casino, gaming salon or Internet gaming provider.

Turning to FIG. 6 a flow diagram for the delivery of a feature bonus is shown. The operator would first configure the parameters of the feature bonus it wishes to provide. Those parameters may include a time when the bonus is to be made available, the amount or maximum amount of the bonus for any gaming device, how the bonus may be earned, whether the system feature bonus is progressive, which machines may be eligible for the bonus and the like. As but an example, the feature bonus may be a progressive prize based upon a percentage of all wagers on all or some of the eligible gaming machines. The system delivered feature bonus would be triggered when the progressive prize reaches either a predetermined or randomly selected amount. Other award triggers can be used such as time of day, total wagers or the operator simply activating the trigger. Backend computer 18 determines at 90 whether the bonus has been triggered. If the bonus has not been triggered play continues without a bonus. If at 90 it is determined that a bonus has been triggered, the system at 92 retrieves the parameters of the bonus such as the amount and criteria for the eligible gaming devices. As but an example, when the bonus is triggered a maximum amount such as a feature value of 1000 credits may be delivered as a bonus to eligible gaming devices on a random basis until the bonus pool is depleted to 0 or a pool seed (starting) amount. The pool may be shared equally among the eligible gaming devices. The maximum amount may be delivered to the gaming device which triggered the bonus with a remainder shared equally among the eligible gaming device between certain maximum and minimum amounts. The award may include a direct award of credits in addition to the feature opportunity value. For example the gaming device which triggered the bonus may receive an award of X credits plus a feature value award with other eligible gaming devices receiving some value for play of a feature. Gaming device eligibility and/or the amount of the award value may be based upon (a) the device being configured to accept a feature value for play as discussed above, (b) play of the gaming device, e.g. amounts wagered during a time (t) having met predefined criteria, (c) the player being identified by the system (such as having their player card read by the PTM 34), (d) the gaming device being a predefined subset of games such as games by a certain manufacturer or games located in a certain location, (e) the identified players being of a certain player tier as established by their historical play at the casino (f) the amount of the pool, (g) or other predetermined criteria as established by the bonus configurator.

At 94 the feature value bonus (including the amount in this case 1000 credits) is delivered though the network 16 to the eligible and identified gaming devices 12. The communication of the bonus is through a slot machine communication interface. The interface is of a type known in the art is, in turn, in communication with the controller 28 and/or state manager 40 of the gaming device 12. As suggested in FIG. 6, one or more of the controller 28 and state manager 40 includes a data structure 96 storing data for the feature values $FV_A$–$FV_X$. At 98 the controller 28 and/or state manager 40 determines and selects the feature and value $FV_S$ in the manner described above. At 100 the player prompts play of the selected feature at the gaming device 12

One of ordinary skill in the art will appreciate that not all gaming machines have all these components and may have other components in addition to, or in lieu of, those components mentioned here. Furthermore, while these components are viewed and described separately, various components may be integrated into a single unit in some embodiments.

The preferred embodiment described above is provided by way of illustration only and should not be construed to limit the claimed invention. Those skilled in the art will readily recognize that the claimed invention can be practiced in a substantially equivalent way with various modifications and changes that may be made to the claimed invention without following the example embodiments and applications illustrated and described herein, and without departing from the true spirit and scope of the claimed invention, which is set forth in the following claims.

What is claimed:

1. A system to retire a progressive jackpot amount among a plurality of gaming devices where each is configured to provide a base game and having at least one feature having a plurality of player payback feature values $FV_A$–$FV_X$, and a communications network to provide communication between said gaming machines and a host processor, the system comprising:

- records corresponding to feature opportunities to play a feature having a player pay back feature value of $FV_1$, the sum of the feature values $FV_1$ substantially equal to said progressive jackpot amount;
- apparatus for players to enable a provided feature opportunity of a said records at gaming devices for play thereof;
- a game controller, at least one of said controller and host processor configured to (a) if a feature value of $FV_A$–$FV_X$=$FV_1$ select the equivalent feature value $FV_S$ for play by the player and (b) if no feature value of $FV_A$–$FV_X$=$FV_1$ select said feature opportunity $FV_S$ as between feature values of $FV_A$–$FV_X$ for play by the player.

2. The system of claim 1 comprising said gaming device includes at least a plurality of feature values $FV_A$–$FV_X$ including $FV_L$ and $FV_H$, where $FV_L<FV_1<FV_H$, at least one of said controller and host processor configured to randomly select between said values $FV_L$ and $FV_H$ for said value $FV_S$.

3. The system of claim 2 comprising randomly selecting a value R between $FV_L$ and $FV_H$ and if R is < or $\leq FV_1$ then selecting $FV_H$ as $FV_S$ otherwise selecting $FV_L$ as said selected value $FV_S$.

4. A method for retiring a progressive jackpot amount among a plurality of gaming devices where each is configured to provide a base game and having a plurality of feature games having a plurality of player payback feature values $FV_A$–$FV_X$ and a communications network to provide communication between said gaming machines and a host processor, the method comprising:

providing for the parceling said jackpot amount into records corresponding to feature opportunities to play a feature having one or more player pay back feature values of $FV_1$;

enabling players to present the feature opportunity of a said record at said one or more gaming devices for play thereof;

configuring a game controller or said host processor for (a) if an feature value of $FV_A$–$FV_X$=$FV_1$ selecting the equivalent feature value $FV_S$ for play by the player and (b) if no feature value of $FV_A$–$FV_X$=$FV_1$ selecting said feature opportunity $FV_S$ for play as between feature values of $FV_A$–$FV_X$.

5. A method for promoting play of gaming devices where each is configured to provide a base game and having at least one feature having a plurality of player payback feature values $FV_A$–$FV_X$, and a communications network to provide communication between said gaming machines and a host processor, the method comprising:

enabling the providing to players of records corresponding to feature opportunities to play a feature having a player pay back feature value of $FV_1$;

providing apparatus for a player to enable a provided feature opportunity of a said record at a gaming device for play thereof;

configuring at least one of a game controller and host processor to (a) if a feature value $FV_1$ is substantially equal to one of the feature values $FV_A$–$FV_X$ to select the equivalent feature value $FV_S$ for play by the player and (b) if no feature value of $FV_A$–$FV_X$=$FV_1$ select said feature opportunity $FV_S$ as between feature values of $FV_A$–$FV_X$ for play by the player.

6. The method of claim 5 comprising enabling the providing to players of records as enabling electronic records to be created corresponding to a feature values $FV_1$ provided to players.

7. The method of claim 5 comprising enabling the providing to players of records as enabling providing of printed vouchers provided to players.

8. A system for promoting play of gaming devices where each is configured to provide a base game and having at least one feature having a plurality of player payback feature values $FV_A$–$FV_X$, and a communications network to provide communication between said gaming machines and a host processor, the system comprising:

records corresponding to feature opportunities provided to players to play a feature having a player pay back feature value of $FV_1$;

apparatus for a player to enable a provided feature opportunity of a said record at a gaming device for play thereof;

at least one of a game controller and host processor configured to (a) if a feature value $FV_1$ is substantially equal to one of the feature values $FV_A$–$FV_X$ to select the equivalent feature value $FV_S$ for play by the player and (b) if no feature value of $FV_A$–$FV_X$=$FV_1$ select said feature opportunity $FV_S$ as between feature values of $FV_A$–$FV_X$ for play by the player.

9. The system of claim 8 comprising configuring said host processor to retain said records of feature opportunities awarded to players at a data structure and to record retirement of said features by said players.

* * * * *